(12) United States Patent
Bashan et al.

(10) Patent No.: US 8,090,407 B2
(45) Date of Patent: Jan. 3, 2012

(54) CONTACTLESS SMART SIM

(75) Inventors: Oded Bashan, Rosh-Pina (IL); Ronnie Gilboa, Moshav Beit Hilel (IL); Guy Shafran, Rosh-Pina (IL)

(73) Assignee: On Track Innovations Ltd., Rosh-Pina (IL)

( * ) Notice: Subject to any disclaimer, the term of this patent is extended or adjusted under 35 U.S.C. 154(b) by 1119 days.

(21) Appl. No.: 11/890,909

(22) Filed: Aug. 6, 2007

(65) Prior Publication Data

US 2009/0005117 A1 Jan. 1, 2009

(30) Foreign Application Priority Data

Jun. 27, 2007 (IL) .......................... 184260

(51) Int. Cl.
*H04B 1/38* (2006.01)
(52) U.S. Cl. .................. 455/558; 455/575.1; 455/575.2; 455/575.3; 455/575.4; 455/575.5
(58) Field of Classification Search ............... 455/575.1, 455/575.2, 575.3, 575.4, 575.5
See application file for complete search history.

(56) References Cited

U.S. PATENT DOCUMENTS

| | | |
|---|---|---|
| 3,674,914 A | 7/1972 | Burr |
| 3,823,403 A | 7/1974 | Walter et al. |
| 3,981,076 A | 9/1976 | Nicolas et al. |
| 4,065,850 A | 1/1978 | Burr et al. |
| 4,417,413 A | 11/1983 | Hoppe et al. |
| 4,450,623 A | 5/1984 | Burr |
| 4,776,509 A | 10/1988 | Pitts et al. |
| 5,025,550 A | 6/1991 | Zirbes et al. |
| 5,186,378 A | 2/1993 | Alfaro |
| 5,223,851 A | 6/1993 | Hadden et al. |
| 5,240,166 A | 8/1993 | Fontana et al. |
| 5,250,759 A | 10/1993 | Watson |
| 5,285,191 A | 2/1994 | Reeb |
| 5,378,857 A | 1/1995 | Swailes |
| 5,448,110 A | 9/1995 | Tuttle et al. |
| 5,572,410 A | 11/1996 | Gustafson |
| 5,606,488 A | 2/1997 | Gustafson |
| 5,606,791 A | 3/1997 | Fougere et al. |
| 5,623,138 A | 4/1997 | Lee |
| 5,705,852 A | 1/1998 | Orihara et al. |

(Continued)

FOREIGN PATENT DOCUMENTS

AT 193136 6/2000

(Continued)

OTHER PUBLICATIONS

R.S. Keogh, "Automated fabrication of high precision planar coils", Electrical Electronics Insulation, Conference, 1995 and Electrical Manufacturing & Coil Winding Conference, Proc. pp. 517-519, Sep. 18-21, 1995.

(Continued)

*Primary Examiner* — Nimesh Patel
(74) *Attorney, Agent, or Firm* — Abelman Frayne & Schwab

(57) ABSTRACT

A mobile communicator including a housing including a main portion and a removable portion, cellular telephone circuitry located within the main portion of the housing, a SIM card mounted in the main portion of the housing, a battery mounted between the removable portion of the housing and the SIM card and a contactless functionality antenna mounted intermediate the removable portion and the battery and communicating with the SIM card.

3 Claims, 9 Drawing Sheets

U.S. PATENT DOCUMENTS

| | | | |
|---|---|---|---|
| 5,741,392 | A | 4/1998 | Droz |
| 5,809,633 | A | 9/1998 | Mundigi et al. |
| 5,862,039 | A | 1/1999 | Oertel |
| 6,023,837 | A | 2/2000 | Finn |
| 6,088,230 | A | 7/2000 | Finn et al. |
| 6,233,818 | B1 | 5/2001 | Finn |
| 6,378,774 | B1 | 4/2002 | Emori et al. |
| 6,604,686 | B1 | 8/2003 | Taban |
| 6,607,135 | B1 | 8/2003 | Hirai et al. |
| 6,626,364 | B2 | 9/2003 | Taban |
| 6,628,240 | B2 | 9/2003 | Amadeo |
| 6,698,089 | B2 | 3/2004 | Finn et al. |
| 6,719,206 | B1 | 4/2004 | Bashan et al. |
| 6,857,552 | B2 | 2/2005 | Wong |
| 6,881,605 | B2 | 4/2005 | Lee et al. |
| 7,170,391 | B2 | 1/2007 | Lane et al. |
| 7,204,427 | B2 | 4/2007 | Patrice |
| 7,224,278 | B2 | 5/2007 | Phaneuf et al. |
| 7,240,847 | B2 | 7/2007 | Puschner et al. |
| 7,243,840 | B2 | 7/2007 | Bason et al. |
| 7,269,021 | B2 | 9/2007 | Gundlach et al. |
| 7,271,039 | B2 | 9/2007 | Halope |
| 7,278,580 | B2 | 10/2007 | Jones et al. |
| 2003/0085285 | A1 | 5/2003 | Luu |
| 2004/0245347 | A1 | 12/2004 | Shibamoto et al. |
| 2005/0212690 | A1 | 9/2005 | Nishikawa |
| 2006/0151614 | A1 | 7/2006 | Nishizawa et al. |
| 2007/0085121 | A1 | 4/2007 | Mikura et al. |
| 2007/0090387 | A1 | 4/2007 | Daniels et al. |
| 2007/0215271 | A1 | 9/2007 | McClintic |
| 2007/0235548 | A1 | 10/2007 | Singleton |
| 2008/0099559 | A1 * | 5/2008 | Lo et al. ........................ 235/441 |

FOREIGN PATENT DOCUMENTS

| | | |
|---|---|---|
| AU | 709049 | 8/1999 |
| CA | 2245775 | 8/1997 |
| CA | 2449413 | 8/1997 |
| CN | 1210602 | 3/1999 |
| DE | 4205084 | 9/1993 |
| DE | 4307064 | 9/1994 |
| DE | 4408124 | 9/1995 |
| DE | 4410732 | 10/1995 |
| DE | 4421607 | 1/1996 |
| DE | 19619771 | 8/1997 |
| DE | 19620242 | 11/1997 |
| EP | 0217019 | 7/1986 |
| EP | 0535433 | 4/1993 |
| EP | 0595549 | 10/1993 |
| EP | 0615285 | 9/1994 |
| EP | 0689164 | 6/1995 |
| EP | 0689164 | 12/1995 |
| EP | 0 880 754 | 2/1997 |
| EP | 0 894 303 | 4/1997 |
| ES | 2146989 | 8/2000 |
| FR | 2555007 | 5/1985 |
| GB | 624369 | 6/1949 |
| GB | 1352557 | 5/1974 |
| JP | 62008313 | 1/1987 |
| JP | 60251861 | 10/1993 |
| JP | 06001096 | 1/1994 |
| JP | 6351194 | 12/1994 |
| JP | 62111821 | 2/2000 |
| JP | 2004-348235 | 12/2004 |
| KR | 0373063 | 5/2003 |
| WO | WO 91/16718 | 10/1991 |
| WO | WO 92/22827 | 12/1992 |
| WO | WO 93/18493 | 9/1993 |
| WO | WO 93/20537 | 10/1993 |
| WO | WO 95/26538 | 10/1995 |
| WO | WO 97/04415 | 2/1997 |
| WO | WO 97/30418 | 8/1997 |
| WO | WO 00/26885 | 5/2000 |
| WO | WO 2005/104584 | 11/2005 |
| WO | WO 2006/052422 | 5/2006 |
| WO | WO 2007080214 A1 * | 7/2007 |
| WO | WO 2007/085115 | 8/2007 |

OTHER PUBLICATIONS

"Shrouds of Time, The history of RFID", An AIM Publication, Oct. 1, 2001.

* cited by examiner

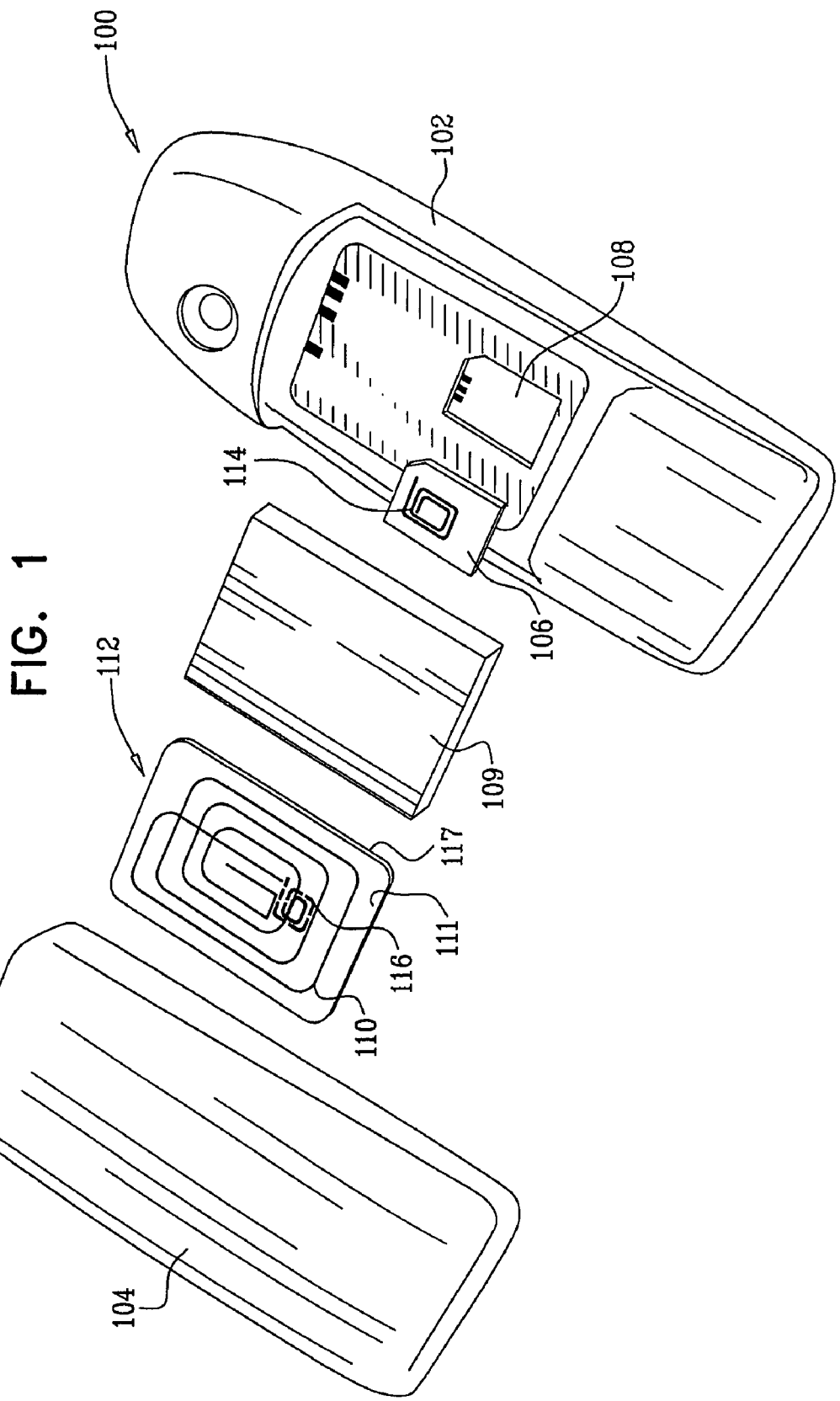

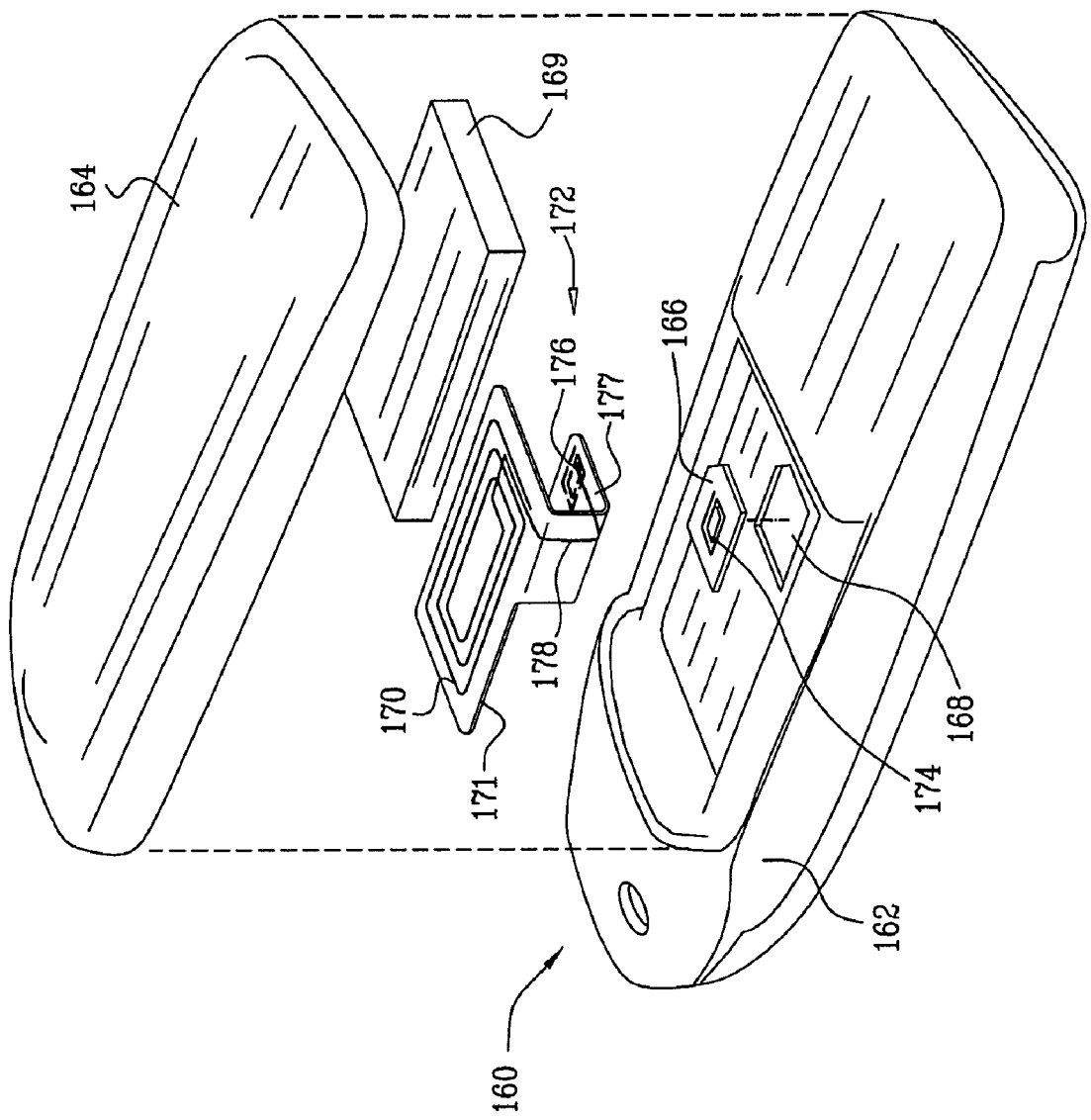

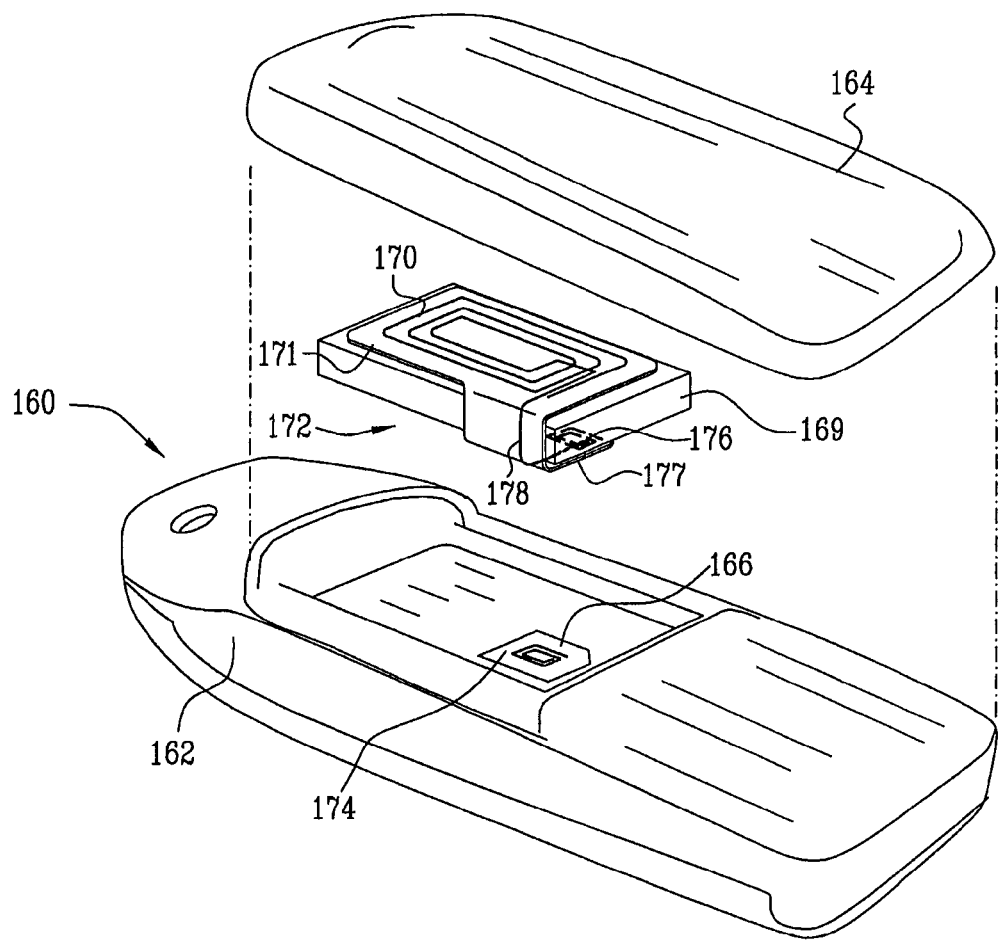
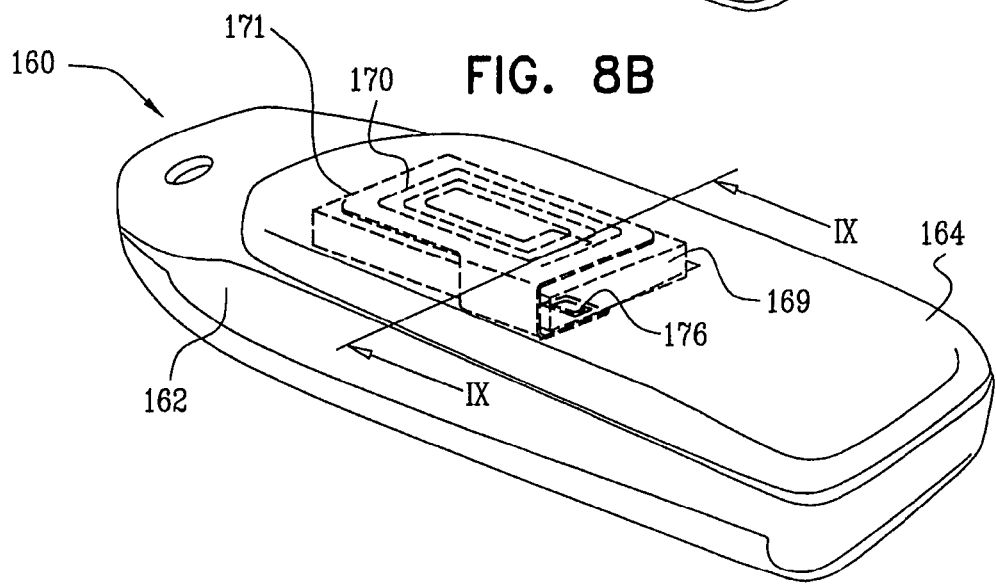

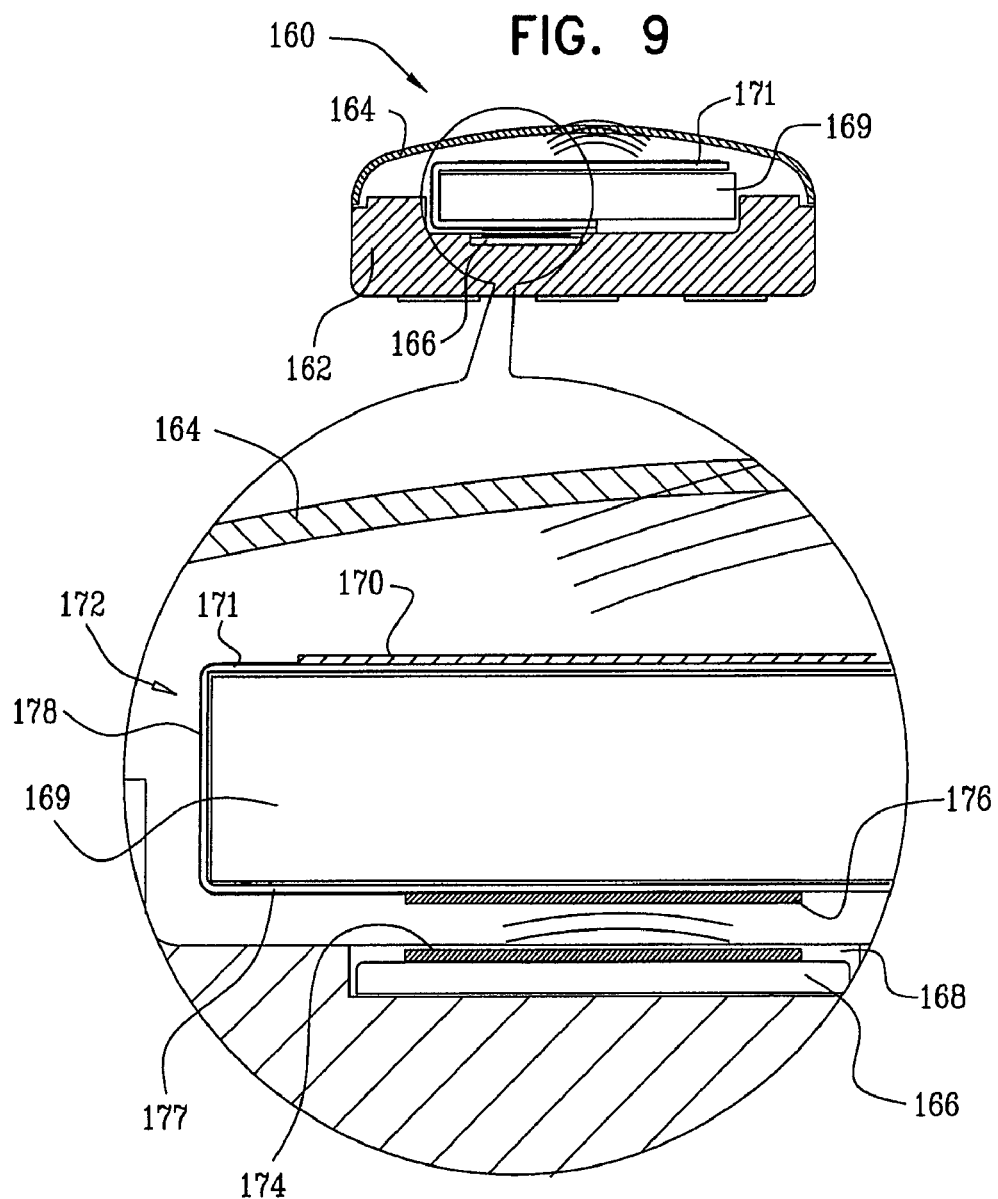

US 8,090,407 B2

1

CONTACTLESS SMART SIM

FIELD OF THE INVENTION

The present invention relates to mobile communicators generally.

BACKGROUND OF THE INVENTION

The following publications, the disclosures of which are hereby incorporated by reference, are believed to represent the current state of the art:
U.S. Pat. No. 6,719,206;
U.S. Published Patent Applications 2005212690; 2003085285; and Japanese Patent Publication JP2004-348235.

SUMMARY OF THE INVENTION

The present invention seeks to provide a mobile communicator having contactless smart card functionality.

There is thus provided in accordance with a preferred embodiment of the present invention a mobile communicator including a housing including a main portion and a removable portion, cellular telephone circuitry located within the main portion of the housing, a SIM card mounted in the main portion of the housing, a battery mounted between the removable portion of the housing and the SIM card and a contactless functionality antenna mounted intermediate the removable portion and the battery and communicating with the SIM card.

Preferably, the contactless functionality antenna is mounted on a substrate containing a paramagnetic material. Additionally, the contactless functionality antenna is mounted on a ferrite substrate.

Preferably, the mobile communicator also includes first and second short range antennas, the first short range antenna being associated with the SIM card and the second short range antenna being coupled to the contactless functionality antenna. Additionally, the second short range antenna is mounted on the substrate. Additionally, the second short range antenna is mounted on a surface of the substrate opposite to a surface of the substrate on which the contactless functionality antenna is mounted. Preferably, the second short range antenna is mounted on a portion of the substrate which lies between the SIM card and the battery.

Preferably, wherein the contactless functionality antenna communicates with the SIM card via a wired connection.

BRIEF DESCRIPTION OF THE DRAWINGS

The present invention will be understood and appreciated more fully from the following detailed description, taken in conjunction with the drawings in which:

FIG. 1 is a simplified exploded-view illustration of a mobile communicator having contactless smart card functionality which is constructed and operative in accordance with a first embodiment of the present invention;

2

Figure 4:
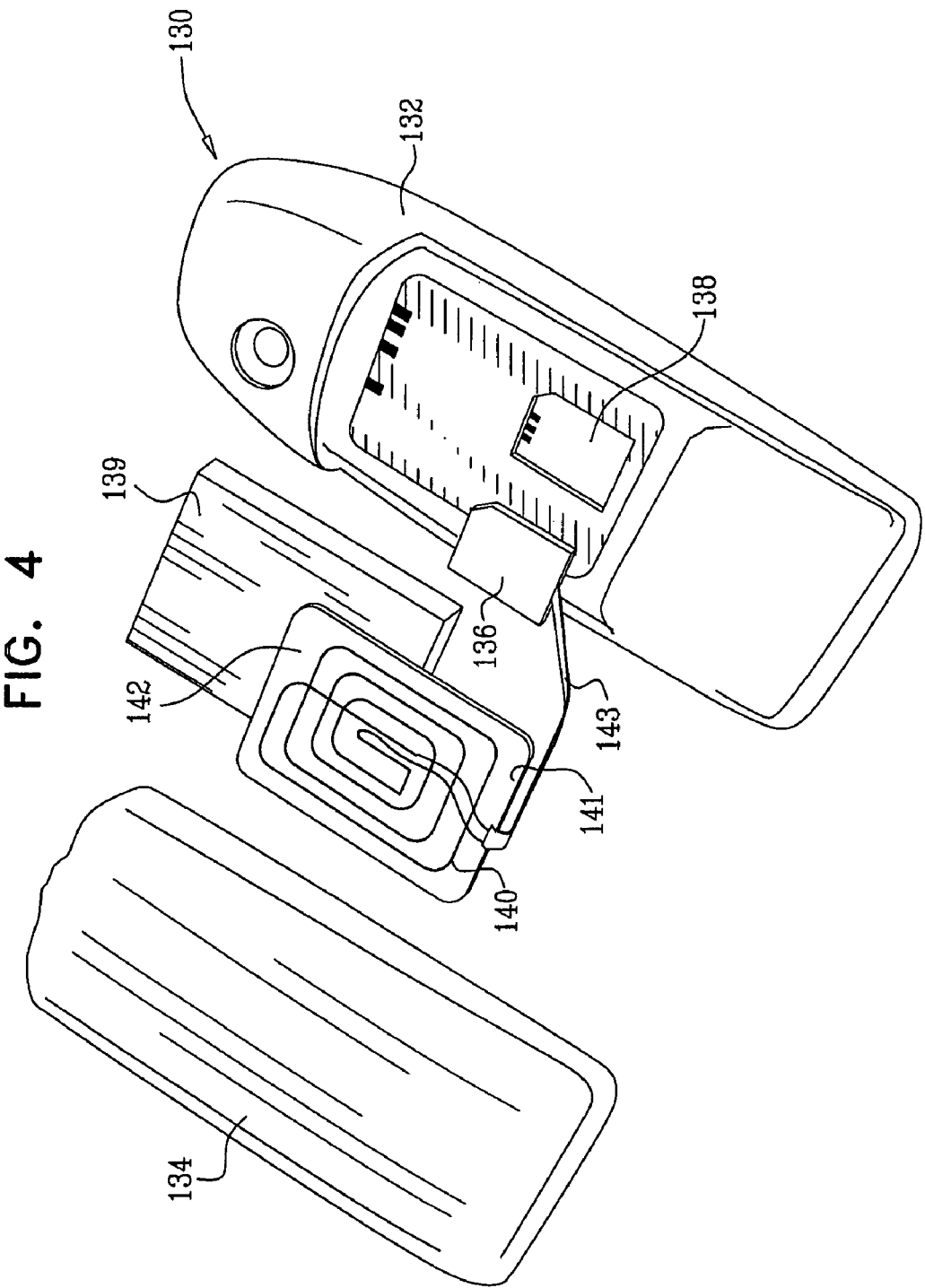
FIG. 4 is a simplified exploded-view illustration of a mobile communicator having contactless smart card functionality which is constructed and operative in accordance with a second embodiment of the present invention.
Figure 5:
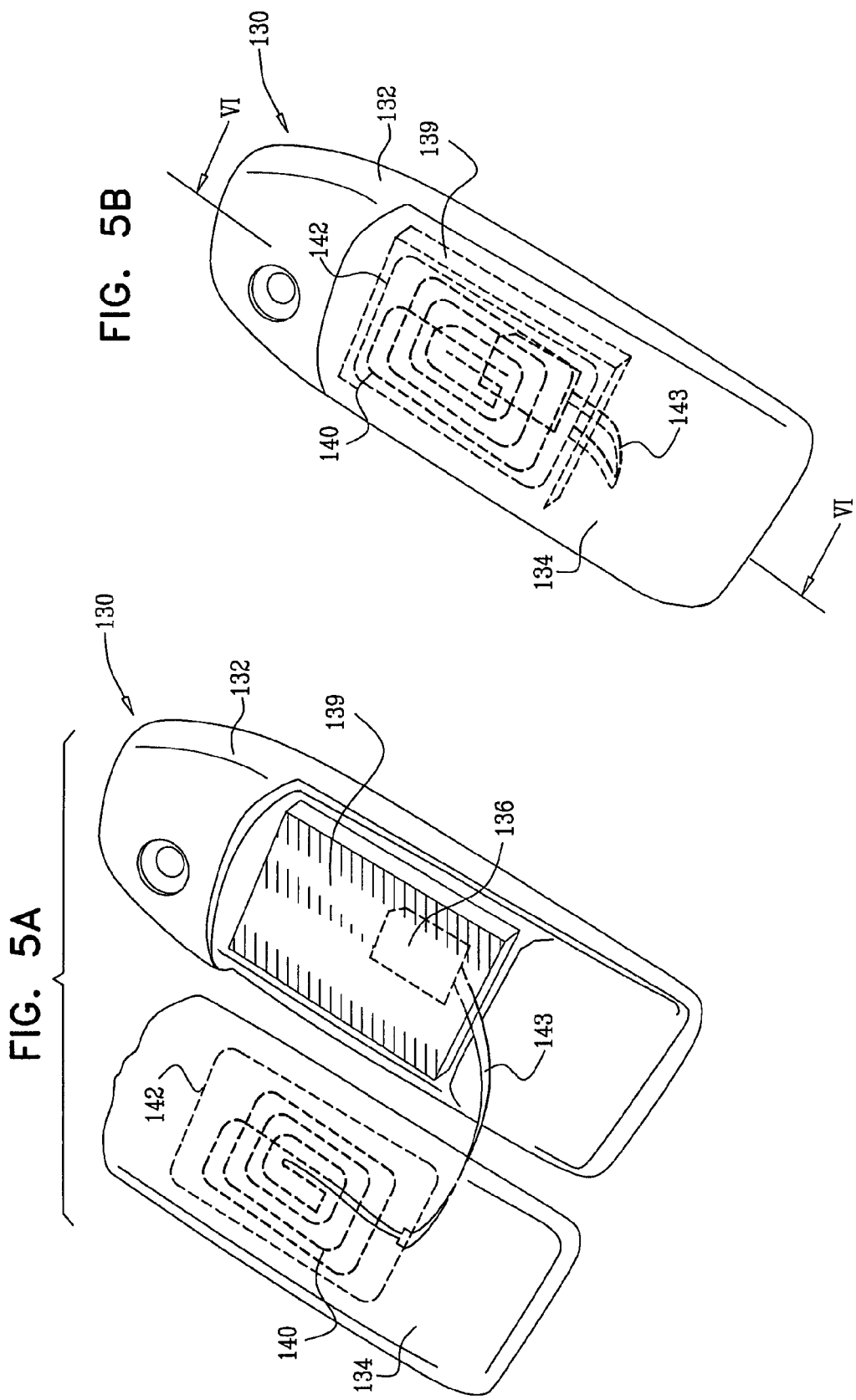
Figure 6:
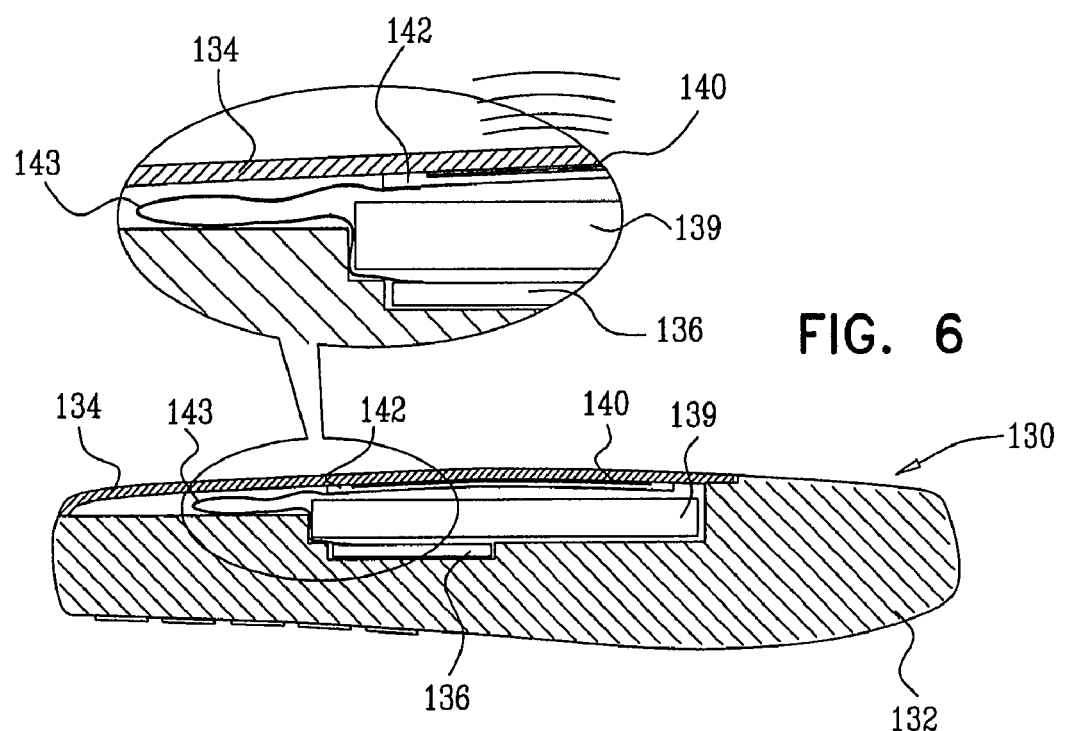

FIGS. 5A and 5B are simplified illustration of the mobile communicator of FIG. 4 in respective partially assembled and assembled states;

FIG. 6 is a simplified sectional illustration, taken along the lines VI-VI in FIG. 5B;

FIG. 7 is a simplified exploded-view illustration of a mobile communicator having contactless smart card functionality which is constructed and operative in accordance with a third embodiment of the present invention;

FIGS. 8A and 8B are simplified illustration of the mobile communicator of FIG. 7 in respective partially assembled and assembled states; and FIG. 9 is a simplified sectional illustration, taken along the lines IX-IX in FIG. 8B.

DETAILED DESCRIPTION OF PREFERRED EMBODIMENTS

Figure 2A:
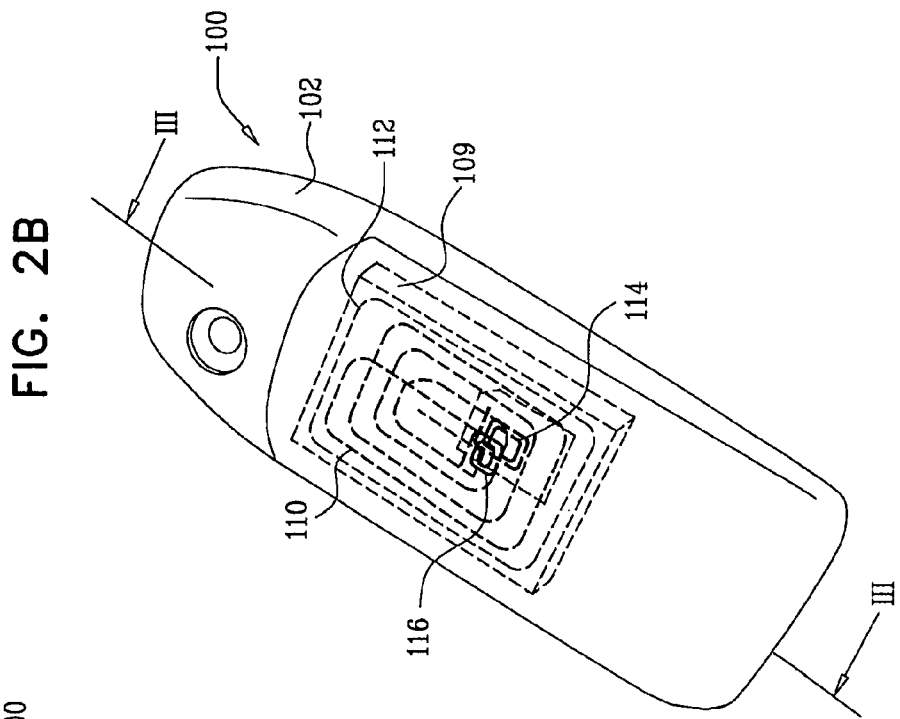
FIGS. 2A and 2B are simplified illustration of the mobile communicator of FIG. 1 in respective partially assembled and assembled states.
Figure 2B:
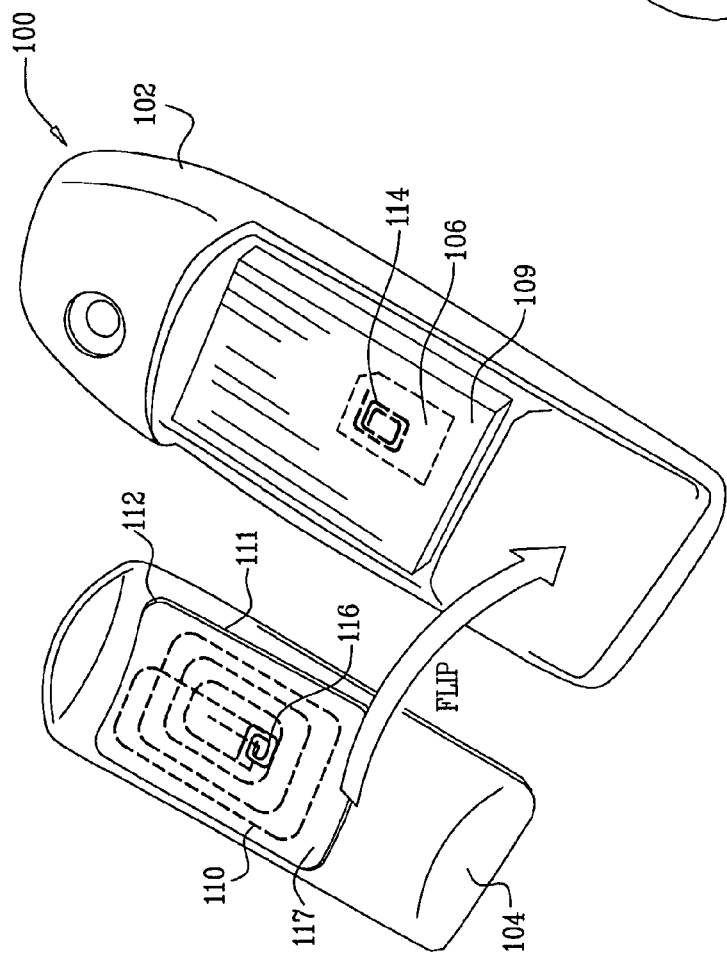
Figure 3:
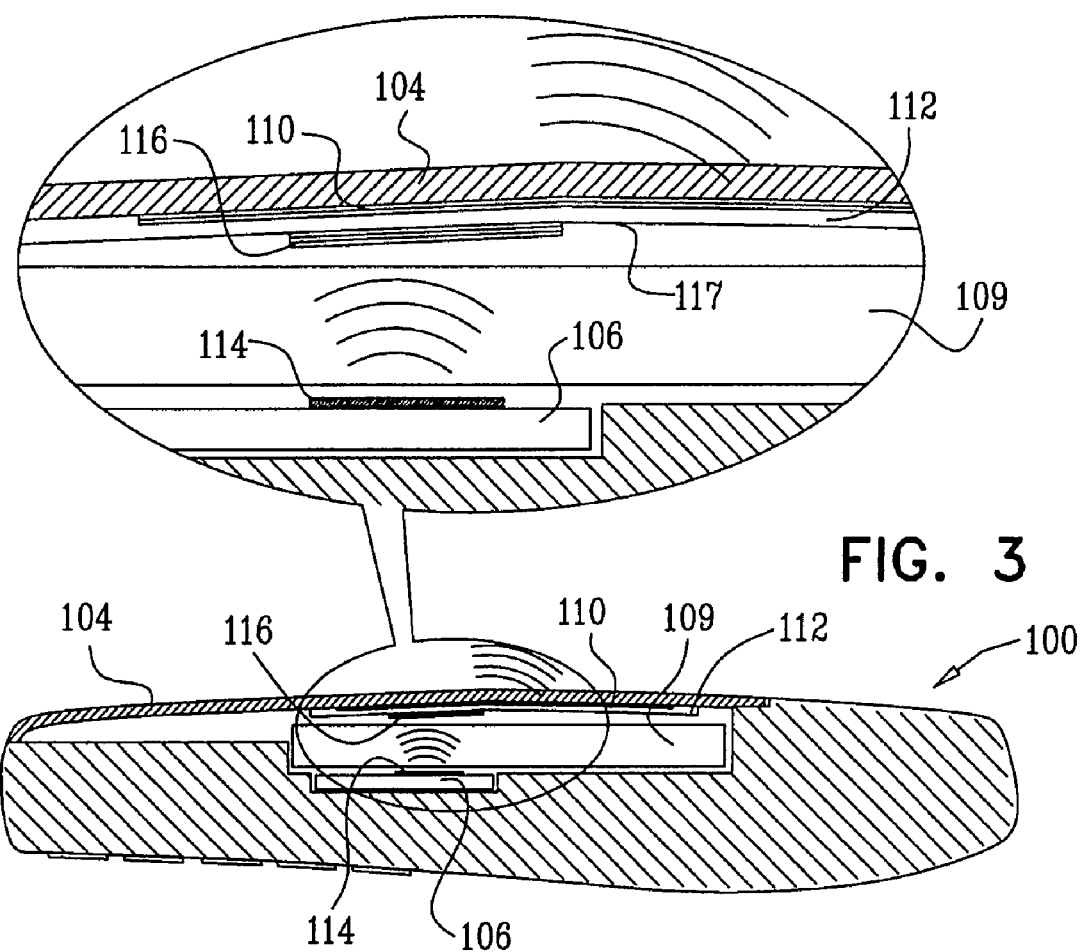
FIG. 3 is a simplified sectional illustration, taken along the lines III-III in FIG. 2B.

Reference is now made to FIG. 1, which is a simplified exploded-view illustration of a mobile communicator having contactless smart card functionality which is constructed and operative in accordance with a first embodiment of the present invention, to FIGS. 2A and 2B, which are simplified illustration of the mobile communicator of FIG. 1 in respective partially assembled and assembled states, and to FIG. 3, which is a simplified sectional illustration, taken along the lines III-III in FIG. 2B.

As seen in FIGS. 1-3, there is provided a mobile communicator 100, preferably a mobile telephone such as a cellular telephone, as shown, but alternatively another type of portable electronic device such as a PDA, which includes a main housing portion 102, a removable cover 104, a SIM card 106 disposed in a SIM card socket 108 located within housing 102 and a battery 109, which is disposed between the housing 102 and the cover 104.

In accordance with a preferred embodiment of the present invention, a contactless functionality antenna 110 is mounted on a first surface 111 of a substrate 112, preferably formed of a paramagnetic material such as ferrite, and located between battery 109 and cover 104. It is a particular feature of the present invention that a substrate 112 formed of a paramagnetic material, such as ferrite, is employed, since such material effectively prevents an unacceptable level of interference between the antenna of the mobile communicator 100 and contactless functionality antenna 110.

In accordance with a preferred embodiment of the invention SIM card 106 is formed with a short range communication antenna 114 which communicates with a corresponding antenna 116 formed on a second surface 117 of substrate 112, opposite to contactless functionality antenna 110 and coupled thereto. SIM card 106 preferably includes integrated circuit functionality for operating the mobile communicator as well as for providing contactless smart card functionality, such as contactless payment functionality in cooperation with a contactless receiver (not shown).

Reference is now made to FIG. 4, which is a simplified exploded-view illustration of a mobile communicator having contactless smart card functionality which is constructed and operative in accordance with a second embodiment of the present invention, to FIGS. 5A and 5B, which are simplified illustration of the mobile communicator of FIG. 4 in respective partially assembled and assembled states, and to FIG. 6, which is a simplified sectional illustration, taken along the lines VI-VI in FIG. 5B.

As seen in FIGS. 4-6, there is provided a mobile communicator 130, preferably a mobile telephone such as a cellular telephone, as shown, but alternatively another type of portable electronic device such as a PDA, which includes a main housing portion 132, a removable cover 134, a SIM card 136 disposed in a SIM card socket 138 located within housing 132 and a battery 139, which is disposed between the housing 132 and the cover 134.

In accordance with a preferred embodiment of the present invention, a contactless functionality antenna 140 is mounted on a first surface 141 of a substrate 142, preferably formed of a paramagnetic material such as ferrite, and located between battery 139 and cover 134. It is a particular feature of the present invention that a substrate 142 formed of a paramagnetic material, such as ferrite, is employed, since such material effectively prevents an unacceptable level of interference between the antenna of the mobile communicator 130 and contactless functionality antenna 140.

In accordance with a preferred embodiment of the invention a wire connection 143 is provided to communicate between contactless functionality antenna 140 and SIM card 136. SIM card 136 preferably includes integrated circuit functionality for operating the mobile communicator as well as for providing contactless smart card functionality, such as contactless payment functionality in cooperation with a contactless receiver (not shown).

Reference is now made to FIG. 7, which is a simplified exploded-view illustration of a mobile communicator having contactless smart card functionality which is constructed and operative in accordance with a third embodiment of the present invention, to FIGS. 8A and 8B, which are simplified illustration of the mobile communicator of FIG. 7 in respective partially assembled and assembled states, and to FIG. 9, which is a simplified sectional illustration, taken along the lines IX-IX in FIG. 8B.

As seen in FIGS. 7-9, there is provided a mobile communicator 160, preferably a mobile telephone such as a cellular telephone, as shown, but alternatively another type of portable electronic device such as a PDA, which includes a main housing portion 162, a removable cover 164, a SIM card 166 disposed in a SIM card socket 168 located within housing 162 and a battery 169, which is disposed between the housing 162 and the cover 164.

In accordance with a preferred embodiment of the present invention, a contactless functionality antenna 170 is mounted on a first portion 171 of a substrate 172, preferably formed of a paramagnetic material such as ferrite, and located between battery 169 and cover 164. It is a particular feature of the present invention that a substrate 172 formed of a paramagnetic material, such as ferrite, is employed, since such material effectively prevents an unacceptable level of interference between the antenna of the mobile communicator 160 and contactless functionality antenna 170.

In accordance with a preferred embodiment of the invention SIM card 166 is formed with a short range communication antenna 174 which communicates with a corresponding antenna 176 disposed adjacent SIM card 166 and mounted on a second portion 177 of substrate 172 extending from portion 171 and folded to lie under battery 169 as shown. Antenna 176 is connected by a wire connection 178 with contactless functionality antenna 170. SIM card 166 preferably includes integrated circuit functionality for operating the mobile communicator as well as for providing contactless smart card functionality, such as contactless payment functionality in cooperation with a contactless receiver (not shown).

It will be appreciated by persons skilled in the art that the present invention is not limited to what has been particularly shown and described hereinabove. Rather the scope of the present invention includes combinations and subcombinations of various feature shown and described hereinabove as well as variations and modifications thereof which would occur to a person skilled in the art upon reading the foregoing description and which are not in the prior art.

The invention claimed is:

1. A mobile communicator comprising:
a housing including a main portion and a removable portion;
cellular telephone circuitry located within said main portion of said housing;
a SIM card mounted in said main portion of said housing;
a battery mounted between said removable portion of said housing and said SIM card;
a contactless functionality antenna mounted on a substrate containing a paramagnetic material intermediate said removable portion and said battery and communicating with said SIM card; and
first and second short range antennas, said first short range antenna being associated with said SIM card and said second short range antenna being coupled to said contactless functionality antenna, said second short range antenna being mounted on a surface of said substrate opposite to a surface of said substrate on which said contactless functionality antenna is mounted.

2. A mobile communicator according to claim 1 and wherein said second short range antenna is mounted on a portion of said substrate which lies between said SIM card and said battery.

3. A mobile communicator according to claim 1 and wherein said contactless functionality antenna is mounted on a ferrite substrate.

* * * * *